INVENTOR

Patented Mar. 20, 1923.

1,448,968

UNITED STATES PATENT OFFICE.

JOSEPH I. KNAGGS, OF TOLEDO, OHIO.

PAN LIFTER.

Application filed March 15, 1921. Serial No. 452,441.

*To all whom it may concern:*

Be it known that I, JOSEPH I. KNAGGS, a citizen of the United States, residing at Toledo, in the county of Lucas and State of Ohio, have invented new and useful Improvements in Pan Lifters, of which the following is a specification.

My invention relates to an improved device designed for lifting and moving pie pans, dishes, lids, etc., to or from an oven or stove, or in general for holding or moving such articles, particularly when they are too hot to be handled with bare hands.

An object of the invention is to provide an implement of the character indicated which shall be simple in construction, readily and quickly attached to or detached from the article to be handled and which will securely hold such article.

Other objects of the invention will appear hereinafter.

Figure 1:
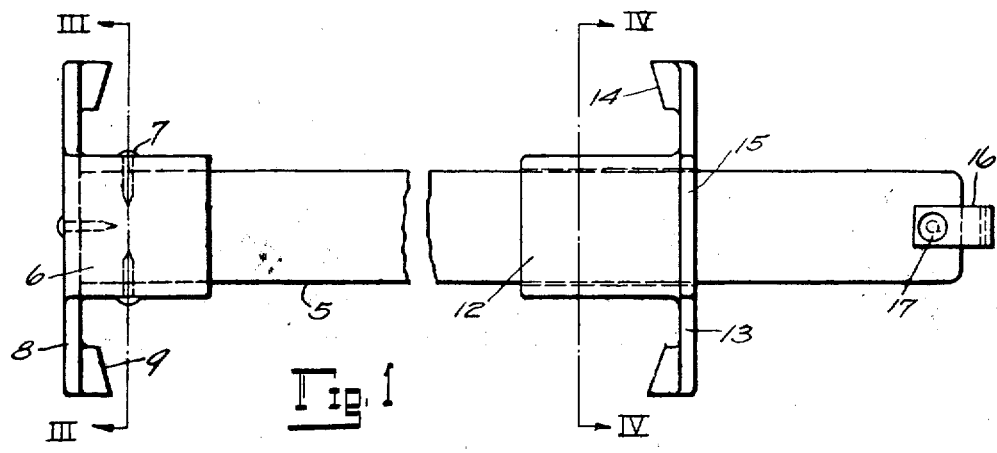
Figure 1 is a plan view of the lifter, partly broken away.
Figure 2:
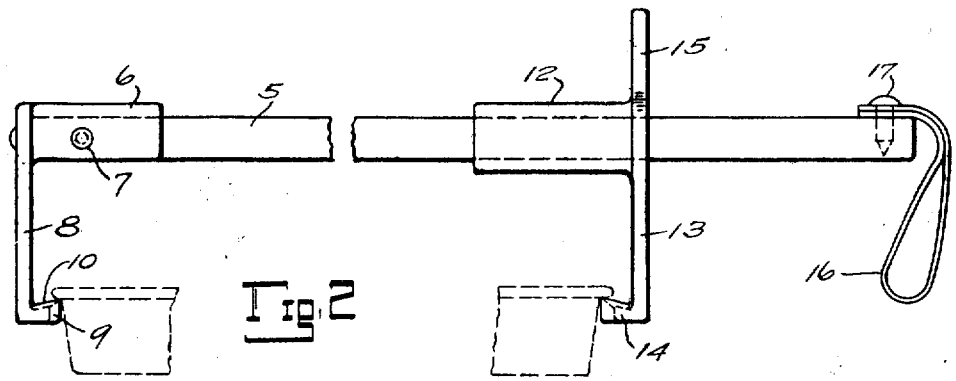
Figure 2 is a side elevation of the same.
Figures 3, 4:
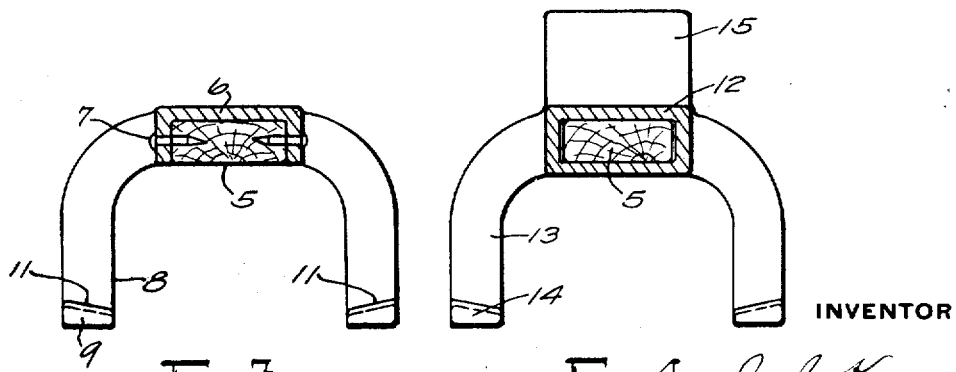
Figures 3 and 4 are sectional views at the planes of the lines III—III and IV—IV respectively on Figure 1.

The lifter comprises a body 5 which may be a straight bar of wood or other suitable material. A fixed gripper 6 is secured to one end of the bar 5 as by means of nails or screws 7. This gripper is in the form of a yoke, the two legs 8 of which terminate in jaws or lugs 9 projecting horizontally forward. The upper surfaces 10 of these jaws are undercut or inclined upwardly and forwardly in order to securely hold the rim of a pan, lid or other article or utensil. The surfaces 10 are also inwardly inclined, their inner edges 11 being downwardly and inwardly inclined, as clearly shown in Figures 3 and 4, which tends to prevent the holder from slipping laterally on the article which is being supported.

A second gripper 12 is mounted to slide freely on the bar 5, and is provided with legs 13 and jaws or feet 14 which are the same in construction as the corresponding parts of the gripper 6. The feet 9 and 14 are a sufficient distance below the bar 5 to provide ample clearance for the usual handles or other projections on lids, etc., and also to provide clearance for the articles of food or the like, such as pies, cakes, etc., which may project above the rim of the container. The gripper 12 is provided with a vertical extension or thumb piece 15 by which the sliding element can readily be moved along the bar 5 to a gripping position and held in place while an article is supported by the lifter. The lifter may be hung up by a loop 16 secured to the bar 5 by a rivet 17, the latter providing a stop which prevents the gripper 15 from becoming accidentally removed from the bar 5 and lost.

Modifications may be resorted to within the spirit and scope of my invention.

What I claim is:

1. A lifter comprising a bar, gripping devices thereon, each in the form of a yoke having vertically depending ends spaced apart and terminating in jaws projecting inwardly and upwardly, said jaws terminating in knife edges, one of said devices being fixed at one end of the bar, and the other slidable on the bar, and a stop to limit the movement of said slidable device.

2. A lifter for cooking utensils comprising in combination, a bar, gripping devices thereon, each in the form of a yoke having vertically depending ends spaced apart, the lower portions of said ends being turned inward and terminating in knife edges, said edges being inclined to the plane of the yoke so that the outer corners are at a greater distance from said plane than said inner corners, said edges also being inclined to the horizontal so that said outer corners are higher than the inner corners.

Signed at Toledo, in the county of Lucas and State of Ohio, this 12th day of March, 1921.

JOSEPH I. KNAGGS.